United States Patent
Ellis et al.

[11] Patent Number: 5,921,500
[45] Date of Patent: Jul. 13, 1999

[54] INTEGRATED FAILSAFE ENGINE MOUNT

[75] Inventors: Joe E. Ellis; Alan R. Stuart, both of Cincinnati, Ohio

[73] Assignee: General Electric Company, Cincinnati, Ohio

[21] Appl. No.: 08/947,274

[22] Filed: Oct. 8, 1997

[51] Int. Cl.⁶ .......................... B64D 27/00; F16M 13/00; F02C 7/20
[52] U.S. Cl. ........................... 244/54; 248/554; 60/39.31
[58] Field of Search ................... 244/54, 53 R, 244/55; 248/554, 555; 60/39.31

[56] References Cited

U.S. PATENT DOCUMENTS

| | | | |
|---|---|---|---|
| 4,603,822 | 8/1986 | Chee | 244/54 |
| 4,742,975 | 5/1988 | Pachomoff et al. | 244/54 |
| 4,997,145 | 3/1991 | Hodgkinson | 244/54 |
| 5,078,342 | 1/1992 | Langley et al. | 244/54 |
| 5,238,206 | 8/1993 | Pachomoff | 244/54 |
| 5,275,357 | 1/1994 | Seelen et al. | 244/54 |
| 5,277,382 | 1/1994 | Seelen et al. | 244/54 |
| 5,303,880 | 4/1994 | Cencula et al. | 244/54 |
| 5,320,307 | 6/1994 | Spofford et al. | 244/54 |
| 5,474,258 | 12/1995 | Taylor et al. | 244/54 |
| 5,524,847 | 6/1996 | Brodell et al. | 244/54 |
| 5,620,154 | 4/1997 | Hey | 244/54 |
| 5,649,417 | 7/1997 | Hey | 244/54 |
| 5,725,181 | 3/1998 | Hey | 244/54 |
| 5,860,623 | 1/1999 | Dunstan et al. | 244/54 |

*Primary Examiner*—Charles T. Jordan
*Assistant Examiner*—Theresa M. Wesson
*Attorney, Agent, or Firm*—Andrew C. Hess; Rodney M. Young

[57] ABSTRACT

An aircraft engine mount includes a mounting platform fixedly joinable to an aircraft pylon, and a cooperating mounting ring fixedly joinable to an aircraft engine. The platform includes four lugs arranged in forward and aft pairs. Four links are arranged in forward and aft pairs pivotally joined at opposite ends thereof to respective ones of the four lugs and to the mounting ring. The four links are symmetrically arranged both circumferentially and axially to carry both thrust loads and in-plane vertical and side loads between the mounting ring and mounting platform with failsafe redundancy.

10 Claims, 3 Drawing Sheets

INTEGRATED FAILSAFE ENGINE MOUNT

CROSS REFERENCE TO RELATED APPLICATION

The present invention is related to concurrently filed application Ser. No. 08/947,143, filed Oct. 8, 1997, entitled "Double Failsafe Engine Mount."

BACKGROUND OF THE INVENTION

The present invention relates generally to aircraft gas turbine engines, and, more specifically, to aircraft mounts therefor.

A gas turbine engine may be mounted to an aircraft at various locations such as the wings, fuselage, or tail by a corresponding structural pylon. The engine is typically mounted at both its forward and aft ends by corresponding mounts for carrying various loads to the aircraft through the pylon. These loads include vertical loads such as the weight of the engine itself; axial loads due to the thrust generated by the engine; side loads such as those due to wind buffeting; and roll loads or torques in three planes. The mounts must also accommodate both axial and radial thermal expansion and contraction of the engine relative to the supporting pylon.

The mounts are typically effective for carrying in-plane loads to the pylon which are those loads occurring in a single axial plane extending radially outwardly from the longitudinal or centerline axis of the engine. These loads include vertical and horizontal components, as well as rotary torque or moments.

Typically, one engine mount is provided for carrying the axial directed thrust load from the engine to the pylon which are usually tension loads during forward propulsion of the aircraft, and compression loads during thrust reverse braking of the aircraft upon landing.

In one exemplary aft engine mount which attaches the engine to the side of an aircraft fuselage, a mounting pin extends laterally outwardly from the fuselage pylon and engages a spherical bearing housing attached to the engine. The various in-plane and thrust loads are carried to the pin using single loadpath connections. The mount must therefore be designed as a monolithic structure which is overdesigned to provide extra strength for increasing the safety margin for avoiding failure. The mount does not include other failsafe features which would provide alternate loadpaths in the event of a failure of any component in the primary loadpath between the engine and the pylon. The single loadpath mount is therefore larger and heavier than typical failsafe engine mounts, which increases cost and reduces aircraft efficiency in view of the additional weight.

Accordingly, a low-weight, failsafe engine mount is desired for attaching the gas turbine engine to the side of an aircraft fuselage.

SUMMARY OF THE INVENTION

An aircraft engine mount includes a mounting platform fixedly joinable to an aircraft pylon, and a cooperating mounting ring fixedly joinable to an aircraft engine. The platform includes four lugs arranged in forward and aft pairs. Four links are arranged in forward and aft pairs pivotally joined at opposite ends thereof to respective ones of the four lugs and to the mounting ring. The four links are symmetrically arranged both circumferentially and axially to carry both thrust loads and in-plane vertical and side loads between the mounting ring and mounting platform with failsafe redundancy.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
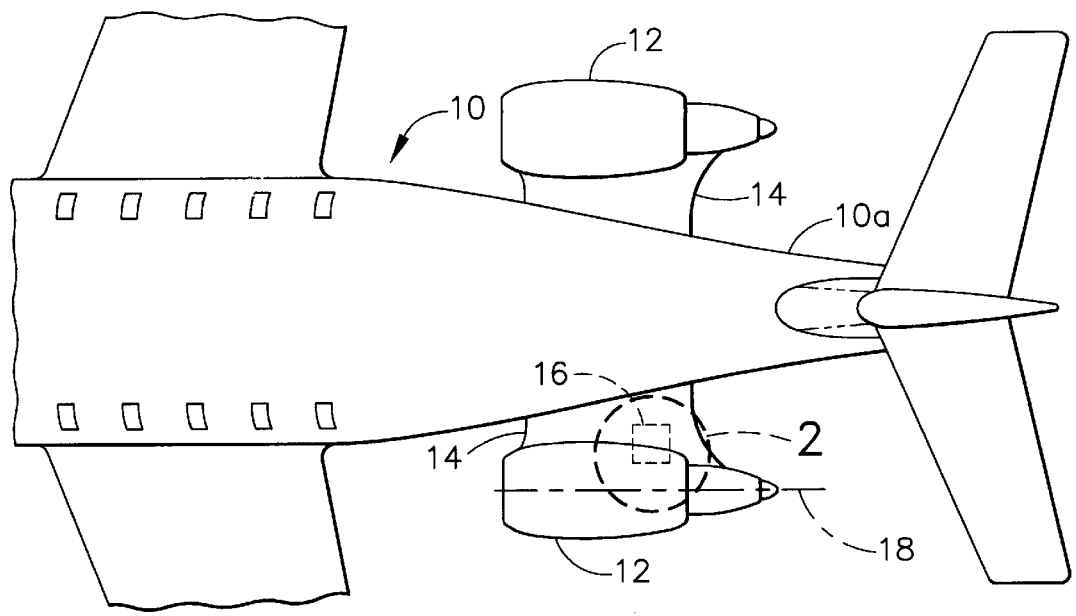
FIG. 1 is a top view of a portion of an exemplary aircraft having a pair of turbofan gas turbine engines side-mounted to the fuselage thereof at corresponding pylons.

Illustrated in FIG. 1 is a portion of an aircraft 10 having a pair of conventional turbofan gas turbine engines 12 mounted thereto in accordance with the present invention. More specifically, the aircraft 10 includes a fuselage 10a from which extend laterally from opposite sides thereof a pair of conventional pylons 14. Each of the engines 12 is mounted to a respective pylon 14 by a forward mount (not shown), and by an aft mount 16 in accordance with the present invention.

Each of the engines 12 illustrated in FIG. 1 is axisymmetric about a longitudinal or axial centerline axis 18 and may have any conventional form. As illustrated in more particularity in FIG. 2, the engine 12 includes an annular combustor casing 12a surrounding an annular combustor (not shown) therein. Although not shown, the engine 12 also includes an upstream fan and compressor, and downstream turbine stages which power the compressor and fan for producing propulsion thrust during operation. The engine 12 includes various outer casings and frames (not shown) which carry the various in-plane and thrust loads to the aft mount 16, and in turn to the aircraft pylon 14.

Figure 2:
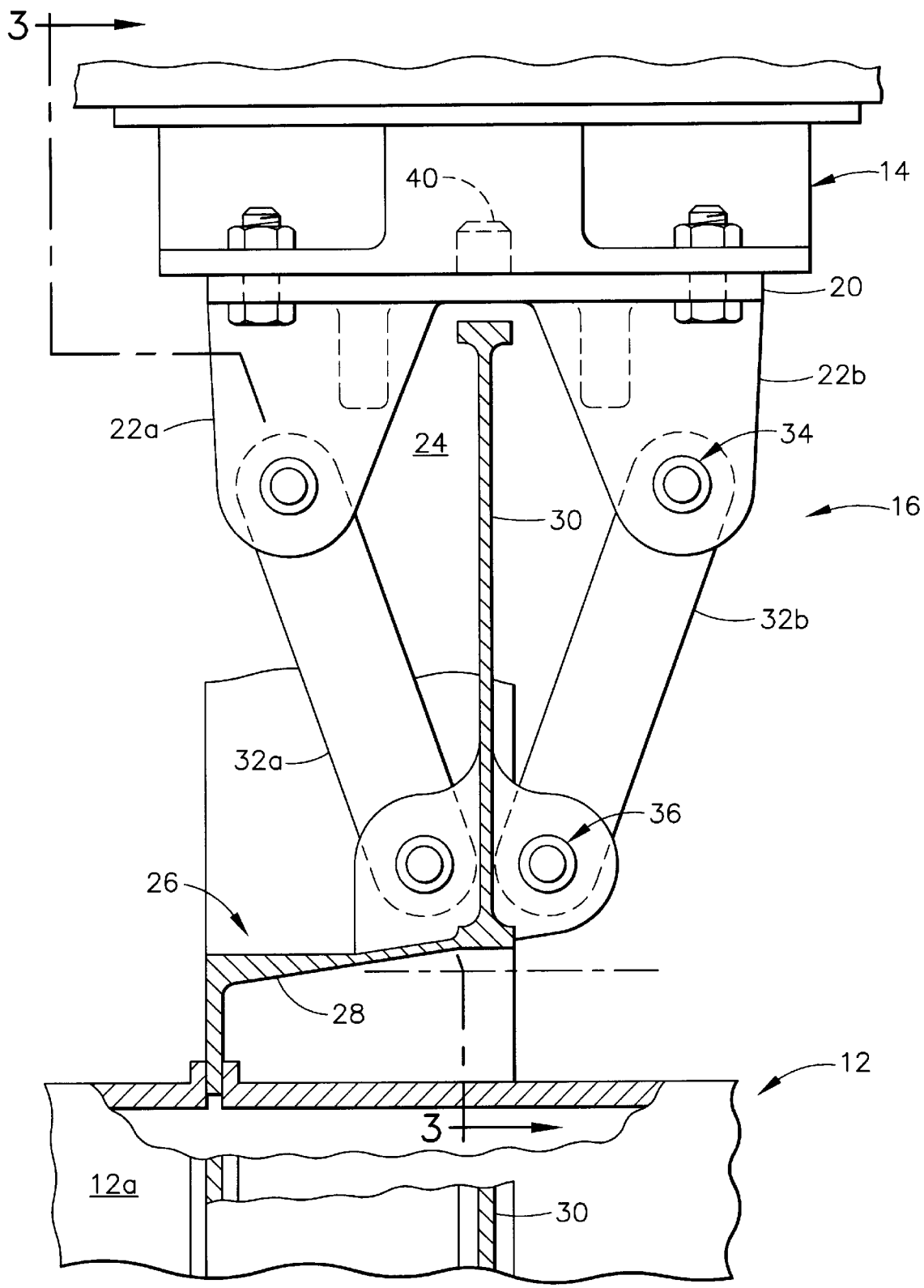
FIG. 2 is a generally top view of an aft engine mount for each of the engines illustrated in FIG. 1 in accordance with a preferred embodiment of the present invention, and taken generally in the dashed circle labeled 2 in FIG. 1, and more specifically along the jogged cutline 2—2 in FIG. 3.
Figure 3:
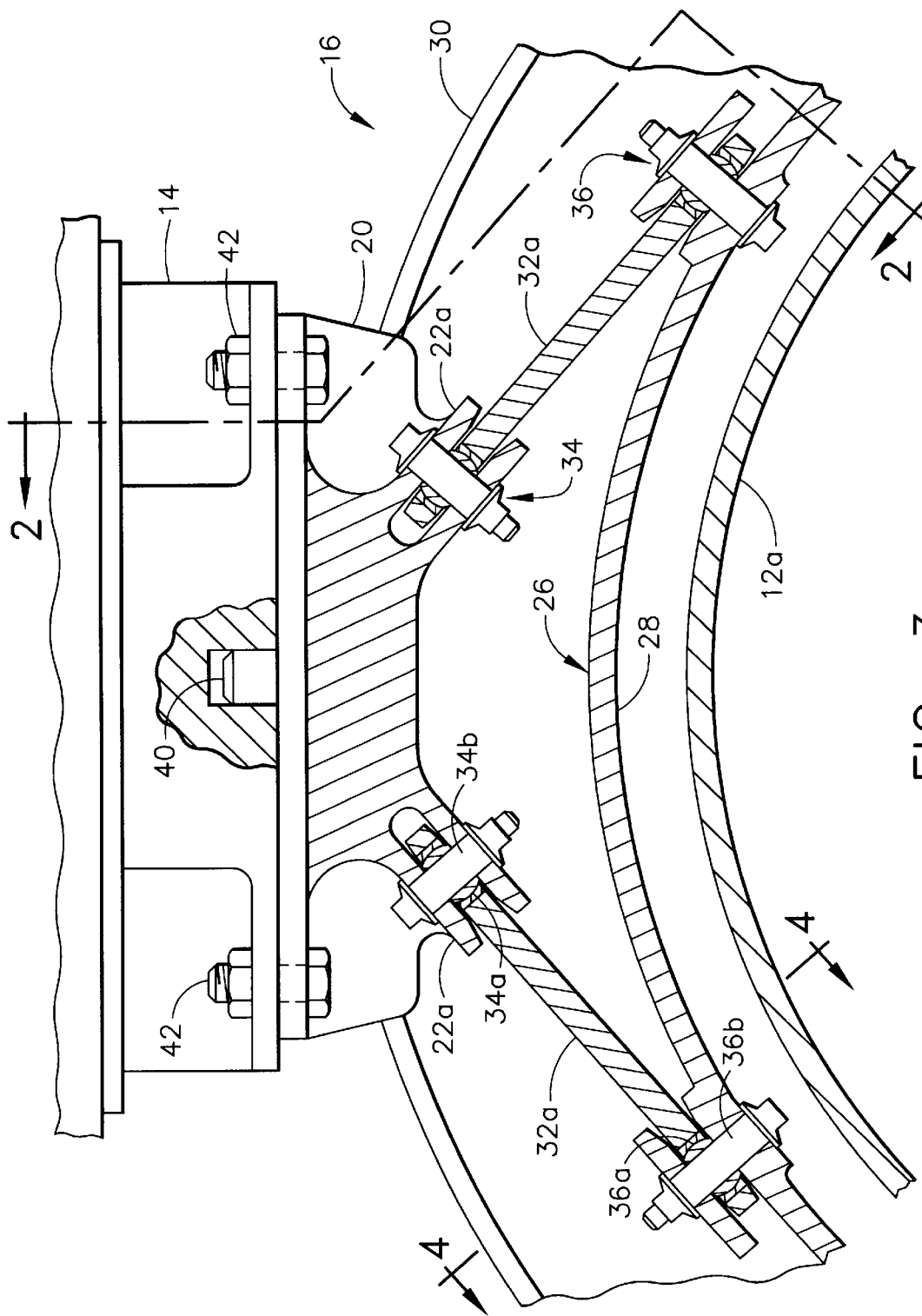
FIG. 3 is a forward-facing-aft view of the aft engine mount illustrated in FIG. 2 and taken along line 3—3.

As illustrated in FIGS. 2 and 3, the aft mount 16 in accordance with an exemplary embodiment of the present invention includes a mounting platform 20 fixedly joined to a complementary portion of the aircraft pylon 14 suitably configured therefor. The mounting platform 20 includes four lugs identified by the prefix 22 which are arranged in forward and aft axially spaced apart pairs designated 22a and 22b. The platform lugs 22 define axially therebetween an access slot 24 which has an open end facing radially inwardly toward the combustor casing 12a relative to the centerline axis thereof.

The aft mount 16 also includes a mounting ring 26 which includes an annular inner mounting flange 28 fixedly joined to the engine 12 at a suitable location, such as at corresponding flanges of the combustor casing 12a, by a plurality of circumferentially spaced apart fasteners or bolts (not shown) in a conventional manner. The mounting ring 26 also includes an outer mounting flange 30 extending radially outwardly from the inner flange 28 and being formed integrally therewith. The outer flange 30 extends radially outwardly from the inner flange 28 and into the access slot 24 axially between the forward and aft lugs 22a,b.

Four substantially identical side links designated by the prefix 32 are arranged in forward and aft axially spaced apart pairs 32a,b pivotally joined at radially outer ends thereof to respective ones of the four lugs 22a,b at suitable outer joints 34. Each of the links 32a,b has a radially inner opposite end pivotally joined to the mounting ring 26 at suitable inner joints 36.

As shown in FIGS. 2 and 3, the four links 32a,b are symmetrically arranged both circumferentially and axially in accordance with the present invention between the mounting ring 26 and the mounting platform 20 to carry both thrust loads and in-plane vertical and side loads therebetween with failsafe redundancy. The substantially identical links 32a,b integrate thrust carrying capability with in-plane load carrying capability, and therefore do not require the use of a separate, differently configured thrust link as found in the prior art. The symmetrical arrangement of the four links 32a,b allows any one of the links to fail, with the loads otherwise carried thereby being instead carried by the remaining three links in a failsafe configuration. Since the aft mount 16 provides failsafe redundant loadpaths, it more efficiently utilizes the provided components leading to a compact and lighter aft mount.

As shown in FIG. 3, the forward links 32a are preferably inclined substantially tangentially to the perimeter of the inner flange 28 and converge circumferentially and radially outwardly form the mounting ring 26 to the mounting platform 20. Correspondingly, the aft links 32b are identically inclined substantially tangentially to the inner flange 28 in the same manner as illustrated in FIG. 3 for the forward links 32a, and similarly converge circumferentially and radially outwardly from the mounting ring to the mounting platform 20. In this way, the reaction loads from the links are circumferentially spread around the mounting ring 26 to reduce distortion thereof, and in turn reduce distortion of the combustor casing 12a.

As shown in FIG. 2, the forward and aft pairs of links 32a,b are inclined axially oppositely forward and aft to converge radially inwardly from the mounting platform 20 to the mounting ring 26 in the preferred embodiment. This configuration allows the links 32a,b to also carry thrust loads in tension or compression, without bending. Forward propulsion of the aircraft will place the forward links 32a in compression and the aft links 32b in tension, which would be opposite with thrust reverse operation effecting opposite tension and compression loads, respectively. Additionally, the links 32a,b may be inclined or converge radially inwardly such that their lines of action, or centerlines, intersect at or near the engine centerline. This will minimize engine bending due to thrust load.

In order to further diminish the potential for engine casing distortion due to the loads carried by the aft mount 16, the inner flange 28 of the mounting ring 26 is preferably cylindrical as illustrated in FIG. 2 for example. It has a proximal or forward end fixedly joined to the engine 12 around the combustor casing 12a as described above using fasteners around the circumference thereof. The inner flange 28 extends aft or rearwardly therefrom and has a cantilevered distal end to which is integrally joined the radially inner or proximal end of the outer flange 30.

Although the outer flange 30 may extend less than 360° over a suitable arcuate extent for mounting the side links 32 to the mounting platform 20, it is preferably a fully annular member extending radially outwardly and perpendicularly from the cylindrical inner flange 28. The outer flange 30 extends radially outwardly and is disposed in outer part in the access slot 24 for maximizing the available strength and rigidity of the mounting ring 26 within the available space of the mounting platform 20. In this way, it provides substantial rigidity and stiffness to the mounting ring 26 for not only carrying the in-plane loads to the mounting platform 20 during both normal and failsafe operation, but also for carrying the thrust loads thereto during failsafe operation.

As shown in FIG. 3, the outer and inner joints 34, 36 may have any conventional configuration including, for example, a conventional spherical bearing or uniball 34a, 36a suitably disposed in respective opposite ends of each of the links 32a,b. Each of the lugs 22a,b is in the form of a radially outer conventional clevis in which the link ends and bearings are mounted, and retained therein by a suitable fastener or pin 34b, 36b extending therethrough.

Figure 4:
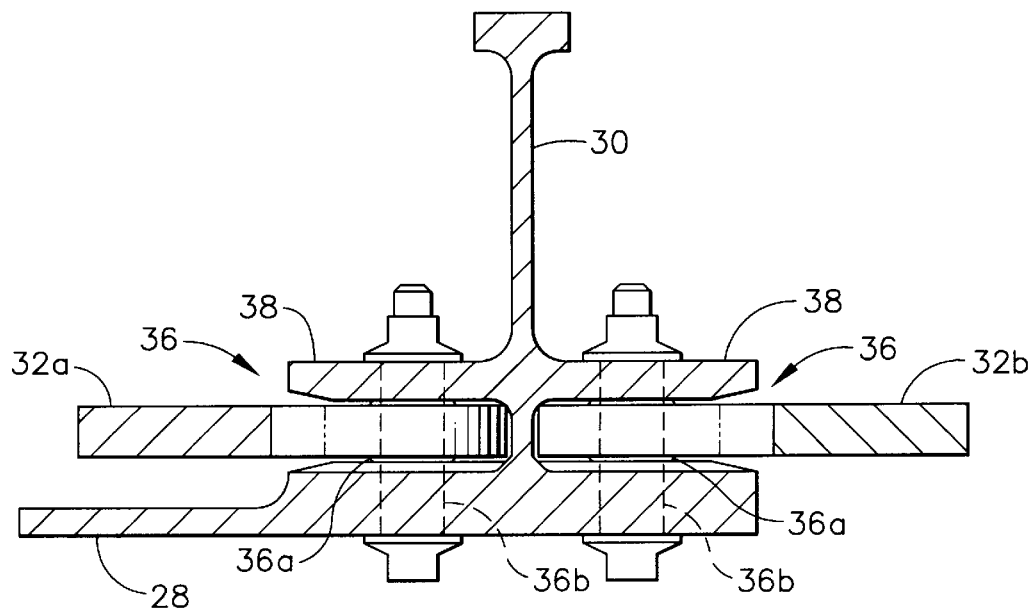
FIG. 4 is a radial sectional view through a portion of the aft engine mount illustrated in FIG. 3 and taken along line 4—4.

As shown in FIGS. 3 and 4, the mounting ring 26 further includes four inner devises 38 which similarly receive the corresponding ends of the links 32a,b in spherical bearings 34a, 36a, with corresponding clevis pins 34b, 36b extending therethrough.

Although aircraft engine mounts typically include various links mounted in devises using spherical bearings, the aft mount 16 illustrated in FIGS. 2–4 provides an improved cooperation of the links 32a,b for integrating thrust and in-plane load carrying capability. As shown in FIG. 3, the respective clevis pins 34b, 36b preferably extend generally radially or generally tangentially to the mounting ring 26, and not axially, for allowing the links 32a,b to pivot axially therearound. The links 32a,b are typically flat elongate plates or beams which may be wider than they are thick. The wide flat sides thereof are disposed tangentially to the perimeter of the inner flange 28 in the preferred embodiment, which requires that the clevis pins 34b, 36b extend generally radially. This allows unrestrained pivotal movement of each of the side links 32a,b circumferentially around the respective clevis pins 34b, 36b, except when installed. And, the spherical bearings conventionally include another degree of pivotal movement axially relative to the clevis pins which is limited to a few degrees only.

As shown in FIG. 2, the outer flange 30 is preferably disposed aft of the inner flange 28, which places the inner flange 28 in tension under the thrust loads carried therethrough during forward propulsion of the aircraft. As additionally shown in FIG. 4, the inner devises 38 are preferably fixedly or integrally attached to both the inner and outer flanges 28, 30 at the juncture therebetween for providing a rigid attachment point using respective portions of both the inner and outer flanges 28, 30. The in-plane vertical and side loads are carried primarily radially relative to the inner flange 28 and the centerline axis of the engine, with the thrust load being carried primarily axially through the inner flange 28. Since the four links 32a,b are pivotally joined at their opposite ends, they do not carry any bending loads, but instead carry either tension or compression which improves their effectiveness and correspondingly decreases the required sizes thereof.

As shown in FIGS. 2 and 3, the thrust and in-plane loads are carried in turn from the mounting ring 26, through the four links 32a,b, and to the mounting platform 20 attached to the pylon 14. The mounting platform 20 preferably includes an integral central shear pin 40 extending radially outwardly from its center which engages a complementary hole in the pylon 14 for carrying the thrust and in-plane loads thereto. A plurality of conventional fasteners or bolts 42 fasten the mounting platform 20 to the pylon 14 and provide an alternate shear path in the event of failure of the shear pin 40. Since the four links 32*a,b* are locked together in a fixed geometry, suitable clearance is preferred around each of the fasteners in the mounting plate 20 to provide alignment adjustment with the forward mount.

As additionally shown in FIG. 3, the side links 32*a,b* of each forward and aft pair are preferably inclined to converge toward the shear pin 40 for reducing or eliminating bending loads in the mounting platform 20, and therefore the aft mount 16 has little or no torque carrying capability, which instead is provided by the forward mount (not shown).

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the mount may be used at any suitable location for mounting the engine to the aircraft at either its fuselage, wings, or tail.

Accordingly, what is desired to be secured by Letters Patent of the United States is the invention as defined and differentiated in the following claims:

We claim:

1. An aircraft engine mount for mounting a gas turbine engine to an aircraft pylon comprising:

a mounting platform fixedly joinable to said pylon, and including four lugs arranged in forward and aft spaced apart pairs;

a mounting ring fixedly joinable to said engine;

four links arranged in forward and aft pairs pivotally joined at opposite ends thereof to respective ones of said four lugs and to said mounting ring; and said four links being symmetrically arranged both circumferentially and axially between said mounting ring and mounting platform to carry both thrust loads and in-plane vertical and side loads therebetween with failsafe redundancy.

2. A mount according to claim 1 wherein:

said forward pair of links converge radially outwardly from said mounting ring to said mounting platform; and said aft pair of links converge radially outwardly from said mounting ring to said mounting platform.

3. A mount according to claim 2 wherein said forward and aft pairs of links converge radially inwardly from said mounting platform to said mounting ring.

4. A mount according to claim 3 wherein said mounting ring comprises:

an inner mounting flange fixedly joinable to said engine; and an outer mounting flange extending radially outwardly from said inner flange.

5. A mount according to claim 4 wherein:

said forward and aft spaced apart pairs of lugs are axially spaced apart to define an access slot therebetween; and said outer flange is disposed in said access slot.

6. A mount according to claim 5 wherein:

said inner flange is cylindrical, and includes a proximal end joinable to said engine, and an opposite distal end; and said outer flange includes a proximal end integrally joined to said distal end of said inner flange, and a radially opposite distal end disposed in said access slot.

7. A mount according to claim 6 wherein said forward and aft pairs of links are disposed substantially tangentially to said inner flange.

8. A mount according to claim 6 wherein:

each of said links includes spherical bearings at opposite ends thereof;

each of said lugs comprises an outer clevis;

said mounting ring further includes four inner devises for pivotally joining respective ones of said links therein; and each of said inner and outer devises includes a clevis pin extending through said spherical bearings for pivotally mounting said links to said mounting platform and said mounting ring.

9. A mount according to claim 8 wherein said clevis pins extend radially for allowing said links to pivot axially therearound.

10. A mount according to claim 8 wherein:

said outer flange is disposed aft of said inner flange; and said inner devises are fixedly attached to both said inner and outer flanges at a juncture therebetween.

\* \* \* \* \*